US009918074B2

(12) United States Patent
Smoot et al.

(10) Patent No.: US 9,918,074 B2
(45) Date of Patent: *Mar. 13, 2018

(54) THREE DIMENSIONAL (3D) STEREO DISPLAY SYSTEMS FOR CREATING 3D EFFECTS FOR VIEWERS WEARING 3D GLASSES

(71) Applicant: DISNEY ENTERPRISES, INC., Burbank, CA (US)

(72) Inventors: Lanny S. Smoot, Thousand Oaks, CA (US); Thomas Tracey Tait, Santa Clarita, CA (US); Mark A. Reichow, Valencia, CA (US); Steven T. Kosakura, Tustin, CA (US)

(73) Assignee: Disney Enterprises, Inc., Burbank, CA (US)

( * ) Notice: Subject to any disclaimer, the term of this patent is extended or adjusted under 35 U.S.C. 154(b) by 217 days.

This patent is subject to a terminal disclaimer.

(21) Appl. No.: 14/742,866

(22) Filed: Jun. 18, 2015

(65) Prior Publication Data
US 2016/0373731 A1 Dec. 22, 2016

(51) Int. Cl.
H04N 13/04 (2006.01)
G03B 35/24 (2006.01)

(52) U.S. Cl.
CPC ......... H04N 13/0431 (2013.01); G03B 35/24 (2013.01); H04N 13/0459 (2013.01)

(58) Field of Classification Search
CPC . H04N 13/0431; H04N 13/0459; G03B 35/24
USPC ....... 348/59, 51, 54; 353/7; 359/464; 349/15
See application file for complete search history.

(56) References Cited

U.S. PATENT DOCUMENTS

| 5,465,175 A * | 11/1995 | Woodgate | G02B 27/2214 348/E13.029 |
|---|---|---|---|
| 2008/0158672 A1* | 7/2008 | McCosky | H04N 13/0431 359/464 |
| 2009/0225154 A1* | 9/2009 | Raymond | H04N 13/0404 348/51 |
| 2011/0304716 A1* | 12/2011 | Sato | G02B 27/2214 348/54 |
| 2012/0105807 A1* | 5/2012 | Volpe | G02B 27/102 353/7 |

(Continued)

Primary Examiner — Mohammed Rahaman
Assistant Examiner — Richard Carter
(74) Attorney, Agent, or Firm — Marsh Fischmann & Breyfogle LLP; Kent A. Lembke

(57) ABSTRACT

A display system creating three dimensional (3D) imagery for a viewer in a viewing space wearing 3D stereo glasses. The 3D stereo glasses have first and second lens passing colored light in first and second ranges of wavelengths. The display system includes a 3D mural element with a display surface facing the viewing space and a light receiving surface opposite the display surface. The display system includes a first wavelength multiplex visualization (WMV) light source outputting a first light stream onto the light receiving surface, and the first light stream has a wavelength in the first range of wavelengths. The display system includes a second WMV light source outputting a second light stream onto the light receiving surface, and the second light stream has a wavelength in the second range of wavelengths. WMV light sources may be directed onto 3D surfaces and props in the viewing space providing 3D effect.

18 Claims, 9 Drawing Sheets

(56) References Cited

U.S. PATENT DOCUMENTS

2013/0063816 A1* 3/2013 Mathiassen ........ G02B 27/2207
  359/464
2013/0120676 A1* 5/2013 Iwahashi .................. B41M 3/06
  349/15
2016/0353095 A1* 12/2016 Tait .................... H04N 13/0431

* cited by examiner

THREE DIMENSIONAL (3D) STEREO DISPLAY SYSTEMS FOR CREATING 3D EFFECTS FOR VIEWERS WEARING 3D GLASSES

BACKGROUND

1. Field of the Description

The present description relates, in general, to three dimensional (3D) projection technology including 3D glasses worn by viewers to perceive 3D imagery, and, more particularly, to 3D stereo display systems that are adapted for creating 3D effects or imagery without the need for 3D projectors and/or 3D content.

2. Relevant Background

Recently, there has been an increased interest in providing movies and other image-based content to viewers in 3D form, and there has been significant research in the past on technologies to produce 3D imagery. Most 3D technologies require the viewers to wear 3D glasses (or other headgear or other filters, which will be labeled "3D glasses" herein) such that left eye images are received by their left eye and right eye images are received by their right eyes, and the combination of these right and left eye images are perceived by the viewers as 3D images or imagery.

Polarization and wavelength multiplex visualization are the two main types of 3D technologies that are in widespread use in cinema applications and in other entertainment venues including amusement or theme parks (e.g., in 3D rides, 3D displays, and other park attractions). With polarization or linear polarized technology, the viewer wears low-cost eyeglasses that contain a pair of different polarizing filters. Each of the viewer's eyes sees a different image (right eye image and left eye image that are provided by cameras (actual or virtual) spaced apart the intraocular distance) because the filters pass only light having a particular polarization (i.e., matching the eyeglass filter) and block the light polarized differently (e.g., in the other polarization direction). Linear polarized technology is used to produce a 3D effect by projecting the same scene into both eyes but depicted from slightly different offsets to create the necessary parallax to provide a 3D image. Use of this technology has the advantage of low cost glasses but is inefficient with light causing loss of brightness and requires a silvered screen to main polarization.

Due to these and other disadvantages, there has been increased interest in the use of wavelength multiplex visualization (also known as interference filters or comb filters and generally labeled "WMV" or "WMV technology" herein). There are at least two main types of WMV technology used to provide 3D displays. In the first type of WMV technology-based 3D systems (e.g., Dolby 3D systems provided by Dolby Laboratories, Inc. or other WMV-based systems provided by other developers/distributors), a single projector is used that can project both left and right eye images using an alternate color wheel placed in the projector. The color wheel contains one more set of red, green, and blue filters in addition to the red, green, and blue filters found on a typical color wheel. The additional sets of three filters are able to produce the same color gamut as the original three filters but transmit light at different wavelengths. 3D glasses with complimentary dichroic filters in the lenses are worn by a viewer that filter out either one or the other set of the three light wavelengths. In this way one projector can display the left and right stereoscopic images simultaneously, e.g., by a stereoscopic projection process that is labeled wavelength multiplex visualization or WMV (or is categorized as one form of wavelength multiplex visualization that may also be considered a narrowband-based WMV or a WMV implementing one or more narrowband sources of illuminating light paired with 3D stereo glasses worn by a viewer to properly filter light from these sources).

This first type of WMV-based 3D system may be desirable because it does not require a silvered screen and can be both rear projected and front projected on most surfaces. Another advantage of this technology is that it can be viewed from multiple points of view clearly and effectively, and it provides relatively uniform brightness across the projected surface regardless of the viewer's point of view. These WMV-based 3D systems also can be used in both theater and other entertainment settings where the viewer may have to tilt and move their heads whereas this is not the case with polarization-based 3D display systems. Presently, the 3D glasses are relatively expensive with a common example being $15 USD in 2015 such that the glasses are not typically considered disposable.

A second type of WMV-based 3D system (e.g., a Christie 6P system available from Christie Digital Systems USA, Inc. or another designer/distributor of this second type of WMV) is built on a fiber-coupled, 6-primary projection system architecture rather than filtered or polarized broad-spectrum white light. In some systems using this second type of WMV, 6-Primary ("6P") laser projectors employ two sets of red, green, and blue (RGB) laser lights, with one set being for the left eye and one, with slightly different wavelengths, for the right eye, which is why this second type of WMV-based 3D system is considered to employ or provide wavelength multiplex visualization. The viewer wears 3D glasses in these systems that filter out the different wavelengths and direct the light to the intended eye. This second type of WMV may be thought of as a laser projector-based WMV. There are a number of advantages associated with these systems including: effectiveness with light as almost 90 percent of the light from the projector makes it to the viewer's eye; does not require a silvered screen and can be both rear and front projected on nearly any surface; can be viewed from multiple points of view with no hot spot and has uniform brightness without regard to a viewer's point of view; can be used in applications where a viewer may tilt or move their head; and has a broad color gamut. As with the first type of WMV system, the stereo glasses for this second type of WMV system are expensive (e.g., $20 to $25 USD/pair), and the light module and other projection components are also relatively expensive.

An ongoing challenge for many applications is how to integrate 3D projection or display systems in larger facilities rather than in the more contained theater setting. For example, many amusement parks include 3D theaters with long queues and 3D ride systems that now utilize wavelength multiplex visualization ("WMV") technology (such as Dolby 3D, Christie 6P, or the like) such that visitors (or "viewers") are now wearing stereo glasses adapted for use with such technologies (such as Dolby or other stereo glasses) rather than polarized glasses. These projection systems work through the realization that all humans see all colors using only the three color sensors in the eye for red, green, and blue. All other colors are synthesized by humans from mixtures of these three fundamental colors. As discussed above, for example, the first type of WMV system functions by splitting the red, green, and blue images to be displayed/projected into two narrow wavelength bands (e.g., Red1, Green1, and Blue2 Blue1 or RGB1) and Red2, Green2, and Blue2 or RGB2). Then, for a left stereo image, the projector (or projectors if two are used) may project light with the wavelength bands for RGB1 and, for a right stereo image, the projector may project light with the wavelength bands for RGB2. The color separation is done with very narrowband color filters or lenses provided in the Dolby 3D and other stereo glasses (e.g., with three filters overlaid for each of the viewer's eyes) such that the lens over the left eye only passes the RGB1 light or images while the lens over the right eye only passes the RGB2 light or images.

Projectors for systems employing wavelength multiplex visualization are expensive such that their use is generally limited to large-scale theatrical experiences. However, in amusement park rides and some theater settings, the viewers may be offered and be wearing the 3D stereo glasses designed for these systems outside of the theater or projection space. For example, a 3D-based ride may include one or more theater-type portions where a WMV projector(s) (e.g., a Dolby 3D projector, Christie 6P projector(s), or the like) is used to project 3D images viewable by the ride participants. However, the ride participants will be wearing the 3D stereo glasses in other portions of the ride, which may be 50 to 90 percent of the length of the ride, where there is no 3D imagery being projected. One solution would be to provide the 3D projectors along the entire length of the ride, but this solution is typically discarded as being prohibitively expensive.

Hence, there remains a need for display systems and methods for providing 3D imagery to viewers such as in locations or spaces outside of a conventional 3D theater setting (e.g., in the queue to or from the theater) and outside of portions of a ride configured for 3D projection.

SUMMARY

The inventors recognized that presently there are many situations where participants in 3D entertainment activities, such as a 3D theater, a 3D-based ride, and the like, are wearing 3D stereo glasses while they are in spaces where no 3D imagery is being projected. For example, a 3D ride may utilize one or more wavelength multiplex technology (WMV) (e.g., Dolby 3D, Christie 6P, or other wavelength multiplex visualization technologies), and the riders wear their 3D stereo glasses (suited for the particular technology and its wavelengths) throughout the ride even though 3D projectors are only provided in one to several locations along the ride (e.g., for 10 percent or less of the ride length). It was understood that it would be useful to provide display systems in spaces where viewers are wearing wavelength multiplex visualization glasses (e.g., Dolby 3D or other WMV-based glasses and all such glasses referred to herein as "3D stereo glasses"), and these display systems should be configured to provide 3D imagery without the need for an expensive 3D projector and/or projected 3D content (left and right images) in contrast to a typical 3D projector-based system.

In one exemplary 3D display system, 3D imagery or effects are provided in the form of wavelength multiplex visualization (Dolby 3D, Christie 6P, or the like) murals. In this regard, the "murals" are flat or nearly flat, non-projected murals that can produce the two streams (stereo) of light required for the 3D stereo glasses such as the narrowband light for the first type of WMV technology discussed above (e.g., Dolby 3D stereo narrowband light) that is filtered by each lens of the glasses to provide left and right eye images to the viewer. The display assembly may include a mural element provided with a lenticular (glasses-free) poster or lenticular 3D panel, with its lenticular array or lenticules positioned to face away from the viewing space in which viewers may be located wearing 3D stereo glasses (or with the back, planar surface of the lenticular 3D panel facing the viewer). A 3D effect or imagery is achieved by providing a pair of light sources opposite the viewing space and directed toward the lenticular array or lenticules (such as at locations where a viewer's eyes normally would have been located to view a conventional lenticular 3D poster). The light sources are chosen to provide two streams of light with wavelengths matching light filtered by the two lenses/filters of the 3D stereo glasses such as wavelengths in the RGB1 wavelength bands and the RGB2 wavelength bands when the 3D stereo glasses are Dolby 3D glasses. In this manner, the viewer is able to see a full color and full stereo image (e.g., the display system provides a 3D effect or imagery without a 3D projector).

More particularly, a display system is provided for creating three dimensional (3D) imagery for a viewer in a viewing space wearing 3D stereo glasses. The 3D stereo glasses have a first lens passing colored light in a first range of wavelengths and with a second lens passing colored light in a second range of wavelengths differing from the first range of wavelengths. The display system includes a 3D mural element with a display surface facing the viewing space and a light receiving surface opposite the display surface. The display system also includes a first wavelength multiplex visualization (WMV) light source outputting a first light stream onto the light receiving surface, and the first light stream has a wavelength in the first range of wavelengths. Additionally, the display system includes a second WMV light source outputting a second light stream onto the light receiving surface concurrently with the second light stream, and the second light stream has a wavelength in the second range of wavelengths.

In some cases, the 3D mural element is a lenticular 3D panel including a lenticular material layer and an ink layer providing a plurality of interlaced images. In such cases, the light receiving surface is a surface of the lenticular material layer with a plurality of lenticules. Further, in these cases, the interlaced images include a set of slices of a first eye image and a set of slices of a second eye image, and, under each of the lenticules, a first one of the slices of the first eye image is repeated at a first plurality of adjacent interlacing locations and a corresponding first one of the slices of the second eye image is repeated at a second plurality of adjacent interlacing locations spaced apart from the first plurality of the adjacent interlacing locations.

In other cases, the 3D mural element may include a parallax barrier and an ink layer adapted for use with the parallax barrier. In still other implementations, the 3D mural element includes a layer of interlaced thin strips of transparent material with first and second polarization and further includes an ink layer comprising alternating first and second eye images. The first WMV light source can then include a first filter whereby the first light stream has the first polarization and the second WMV light source can include a second filter whereby the second light stream has the second polarization.

In some applications, the first and second WMV light sources are positioned relative to the light receiving surface and first and second viewpoints. In these and other applications, the display system may include additional pairs of the first and second WMV light sources, and each of the pairs of the first and second WMV light sources are sequentially operated over a time period, whereby the 3D imagery is animated over the time period. The first WMV light source may include one or more lights and also a first WMV filter providing the first light stream with the wavelength in the first wavelength range. In these implementations, the second WMV light source may include one or more lights and a second WMV filter providing the second light stream with the wavelength in the second wavelength range. The first wavelength range and the second wavelength range may correspond with first and second wavelength ranges of light output from a WMV projector, and the WMV projector may include at least one projector implementing Dolby 3D, Christie 6P, or another WMV technology.

DETAILED DESCRIPTION OF THE PREFERRED EMBODIMENTS

Briefly, the present description is directed toward three dimensional (3D) stereo display systems that are each adapted for creating 3D effects, e.g., displaying 3D objects or images, that are perceivable by viewers wearing 3D stereo glasses. Viewers, in a viewing space, wear glasses with lenses providing filters for the left and right eyes and suited for a particular wavelength multiplex visualization (WMV) technology such as a first type of WMV technology (e.g., Dolby 3D or the like), a second type of WMV technology (e.g., Christie 6P or the like), or another type of WMV technology that is already invented or yet to be invented. The 3D stereo displays systems may be positioned in an area or viewing space outside a 3D projection space to take advantage of the fact the viewers are wearing the 3D stereo glasses which allows light to be selectively provided to each of the viewer's left and right eyes for stereo experiences. For example, riders in a 3D ride may be entertained by 3D display systems in portions of the ride path that do not include 3D projectors as the 3D display systems are configured to provide light-based effects building upon the WMV technology of the 3D stereo glasses.

The following description begins with a discussion of a suite or set of techniques that use 3D mural elements to create 3D imagery for viewers wearing WMV-based 3D stereo glasses. The relatively flat mural or mural elements can be created with very little manufacturing cost because they can be provided by modifying existing 3D lenticular posters or other 3D materials and/or by using these 3D materials in new ways (e.g., with lighting with wavelengths matching filters in 3D stereo glasses). For example, an ordinary or conventional lenticular image sheet or 3D lenticular panel (or poster) is included in a display system but oriented to face away from the viewer or with its planar back surface facing a viewing space and two (or more) light sources provide two different bandwidth light is directed onto the lenticular surface and then through the printed image layer and to the viewer's eyes via their 3D stereo glasses. After the 3D mural-based display systems are discussed, several additional display systems are described that also make use of 3D stereo glasses and unique lighting techniques to create new and unique 3D imagery (or light-based 3D effects rather than 3D content effects).

Figure 1:
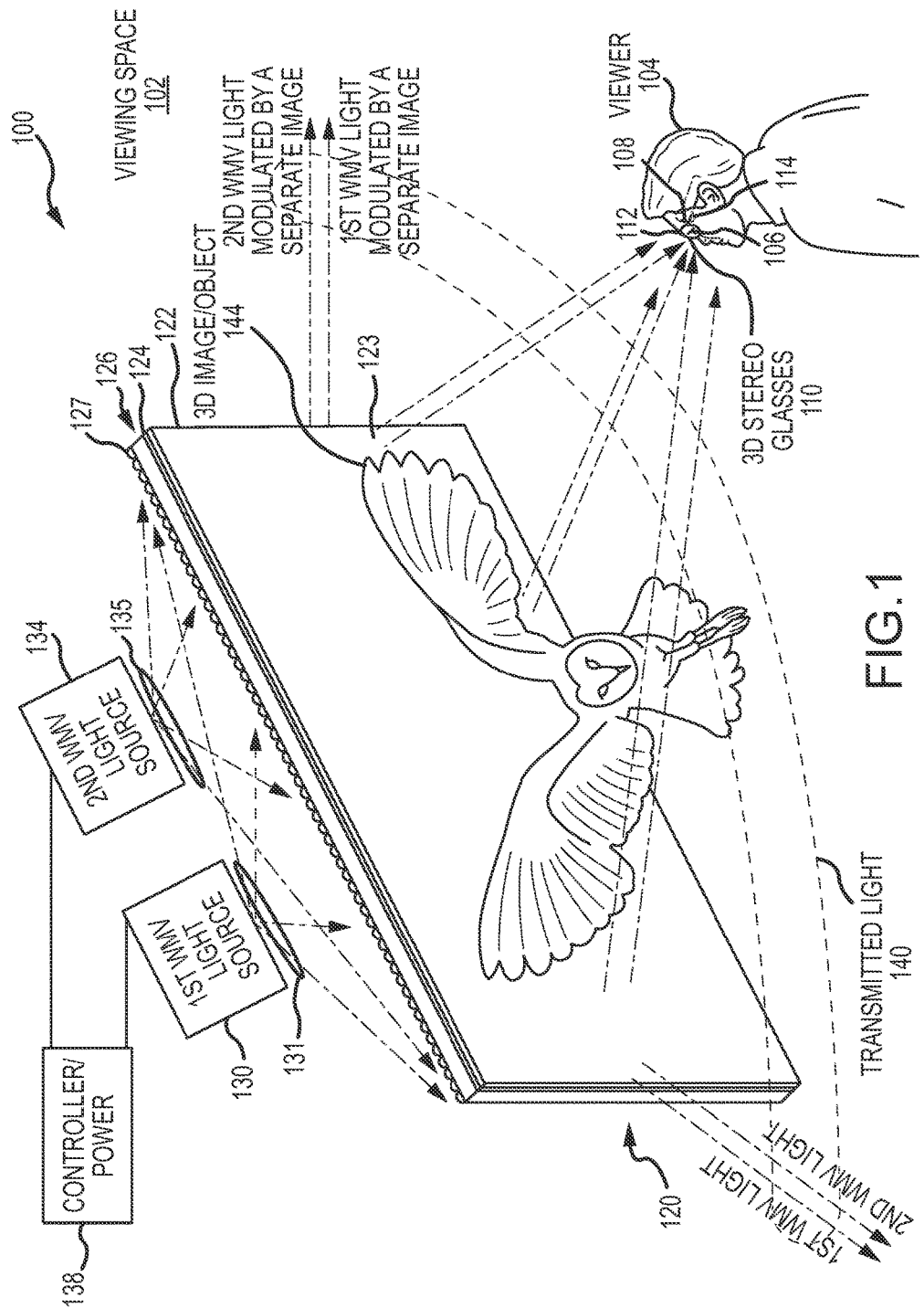
FIG. 1 is a diagram or functional block diagram of a 3D display system of the present description displaying 3D imagery to a viewer wearing 3D stereo glasses with a 3D mural element in the form of a modified lenticular 3D panel paired with two (or more) wavelength multiplex visualization (WMV) light sources (e.g., providing RGB1 and RGB2 wavelength light to the modified lenticular 3D panel)

FIG. 1 is a diagram or functional block diagram of a 3D display system 100 of the present description that is operating to display a 3D image or object 144 to a viewer 104 wearing 3D stereo glasses 110 with a 3D mural element 120. In general, the mural element 120 may take the form of a modified lenticular 3D panel paired with two (or more) wavelength multiplex visualization (WMV) light sources (e.g., providing RGB1 and RGB2 wavelength light to the modified lenticular 3D panel) 130, 134.

In a simple example, lenticular (glasses-free) posters and displays work by serrating two (stereo) images to be viewed by a viewer into extremely narrow vertical strips. The strips of the image for the left and right eye are interleaved or interlaced (e.g., left strip, right strip, left strip, and so on). Vertical cylindrical lenses or lenticules are placed in front of these two alternating strip images, and the lenses may be built into a "lenticular" plastic cover sheet as shown with layer 126. The lenses or lenticules direct the light from the strips into two angles of view that are to the left and right of the center perpendicular to the sheet. The left eye image is only visible to the left of the center of the lenticular image, and the right eye view only from right of center.

A persons standing directly in front of the poster will see a stereo image. To allow more freedom of movement (left and right) for the viewer, modern lenticular devices may contain 30 or more images (e.g., 30 separate pictures are vertically slit and placed behind each lenticule or lens in an interlaced manner (i.e., strip from Image 1, strip from Image 2 . . . strip from Image 30, and repeat for each lenticule)). Each of the images may be taken with a camera that translates left to right a small distance and then takes a picture. When a person looks at a modern lenticular device, their left eye sees a picture and their right eye sees a picture that was taken from a position several locations over. If the lenticular device is well designed and made, the viewer's two eyes will see a scene that is natural and in 3D as if their two eyes were at the originating scene captured by the camera.

A lenticular 3D panel or poster is a way to take interleaved images and show them to a viewer based on the angle of the viewer to the plane of the lenticular 3D panel or poster. The inventors recognized that this "image-to-angle" technique can be used in reverse (as shown in the display system 100 of FIG. 1). If a display system is configured such that bright light sources are placed at the location where a viewer's eyes would have been in a conventional use of a lenticular 3D panel or poster, the strips/slices of the image are lit up or illuminated that correspond to the two angles at which the lights are placed. If one of the light sources provides RGB1 light (or one of the light outputs of a WMV projector) and the other provides RGB2 light (or the other one of the light outputs of the WMV projector), the two images (which may be full color) lit up on the surface of the lenticular 3D panel will be illuminated with RGB1 light and RGB2 light, respectively. Then, if the viewer looks at the lenticular 3D panel or poster from the back side (side opposite the lenticules) using Dolby 3D glasses (or glasses suited to the technology of the WMV projector), the viewer sees a full stereo image which may also be full color (when the printed ink image is full color). If a conventional lenticular 3D poster or panel is used, it typically is modified by peeling off or removing backing (e.g., a nominally thin white and opaque cardboard sheet) from the lenticular 3D poster or panel (to leave the 3D mural element 120 of FIG. 1, for example).

As shown, the display system 100 includes a 3D mural element 120 with an outer or exposed surface (or display surface) 123 facing into or towards a viewing space 102. For example, the viewing space 102 may be a portion of a 3D amusement park ride where 3D projectors may be lacking and it is desired to provide 3D entertainment. In this regard, the viewer 104 in the space 102 is shown to be wearing 3D stereo glasses 110. The 3D stereo glasses 110 are configured for use with a WMV projector (e.g., a Dolby 3D, Christie 6P, or other type of WMV technology projector(s)), and, in this regard, the glasses 110 include a first lens or filter(s) 112 and a second lens or filter(s) 114 that (when the glasses 110 are worn) are positioned between the display surface 123 and the viewer's left and right eyes 106, 108, respectively. The first filter 112 is adapted to pass light within a first bandwidth range while the second filter 114 is adapted to pass light within a second bandwidth range (differing from the first bandwidth range) such as the two bandwidth ranges provided by a WMV projection system to provide left and right eye image streams. For example, the viewer 104 may have been wearing the glasses 110 in a theater or similar setting to view images from a WMV projector (e.g., a Dolby 3D, Christie 6P, or other WMV projector) and leave the glasses 110 on when entering the viewing space 102.

The 3D mural element 120 in this embodiment takes the form of a modified lenticular 3D panel, 3D lenticular poster, or the like. The 3D lenticular panel is "modified" by positioning it to face away from the viewing space 102 and viewer 104 such that the display surface 123 is the "back" planar surface or layer 122 of the lenticular 3D panel that normally would be attached to a wall or otherwise face away from the viewer 104 in a conventional use of such a lenticular 3D panel. A conventional panel or poster may also be "modified" by removing (if necessary such as when not manufactured specifically for the display system 100) a cardboard or other opaque backing layer (not shown in FIG. 1). The 3D mural element 120 includes a diffuser or diffuser layer 122 for receiving and displaying light 140 (or providing projected light 140) that can be perceived by the viewer 104 via the 3D stereo glasses 110 as a 3D image/object, and the diffuser layer 122 often will be a planar film of material that is translucent to nearly transparent to light and which may be white or another useful color as known in the lenticular display industry.

The 3D mural element 120 further includes an ink or printed image layer 124 that may be printed upon the diffuser layer 122 (or onto a planar back surface of the lenticular material layer 126). The ink layer 124 is configured to generate a 3D image when viewed through a lenticular material layer 126, and, to this end, the ink layer 124 typically includes a plurality of frames (or images) of a scene or object from differing viewpoints that are interlaced (thin slices of each of the frames or images are interlaced to be provided under each of the lenticules in the lenticular material layer). This interlacing of the image slices may be provided in a conventional manner that is known to those skilled in the lenticular display industry such that it does not need to be described in further detail here. However, the interlacing may also be performed in a manner that enhances operations of the 3D mural element 120 as discussed further below.

The 3D mural element 120 further includes a layer 126 of lenticular material, e.g., a film or sheet of transparent material (e.g., plastic or the like) with an array of lenticules formed on one side. As shown, a planar first or back surface of the lenticular material layer 126 abuts or mates with the ink layer 124 while a second or front surface 127 of the lenticular material layer 126 that includes numerous lenticules (or side-by-side, parallel elongated or linear lenses (slanted or not slanted)). Hence, the lenticules on the front surface 127 face away from the viewing space 102 and the viewer 104 wearing the 3D stereo glasses 110.

To achieve a 3D effect with the mural element 120, the 3D display system 100 includes a first WMV light source 130 and a second WMV light source 134. A controller 138 (which may also be a power source for the light sources 130, 134 or separate power sources may be provided) is used to control operations of the two light sources 130, 134 such that the 3D image/object 144 may be provided on an ongoing basis (sources 130, 134 controlled to be "on" during operation of the display system 100) or intermittently or selectively (sources 130, 134 controlled to concurrently operate 130, 134 to provide output light streams 131, 135 to provide left and right eye images to the viewer's eyes 106, 108 via 3D stereo glasses 110).

The light sources 130, 134 are "WMV" light sources because each is designed to provide light 131, 135, respectively, similar to the light outputs of a WMV projector. Particularly, the light 131 may be light with a bandwidth falling in a first bandwidth range (e.g., RGB1 if the 3D stereo glasses 110 are Dolby 3D-type glasses) while the light 135 may be light with a bandwidth falling in a second bandwidth range differing from the first bandwidth range (e.g., RGB2 if the 3D glasses 110 are of the first type of WMV discussed above stereo glasses, which may take the form of Dolby 3D stereo glasses or other stereo glasses provide by WMV technology manufacturers and/or distributors). The light sources 130, 134 may each include a light source combined with an appropriate filter to pass one of the two light streams used in a WMV system. For example, a white light source such as a high brightness light emitting diode (LED) may be combined with an RGB1 or RBG2 filter to generate the two lights streams 131, 135 so as to pass RGB1 light 131 (or 135) and RGB2 light 135 (or 131) onto the front or light receiving surface 127 (onto the lenticular material layer 126) of the 3D mural element 120.

The two streams of WMV light 131, 135 are redirected or focused by the lenticules of layer 126 to illuminate a set of the interlaced image slices in the ink or printed image layer 124. Transmitted light 140, made up of first and second WMV light streams (as shown) that are each modulated by a separate image from layer 124, is transmitted outward in all directions from the diffuser layer 122 from display surface 123 of the 3D mural element 120 into the viewing space 102. A viewer 104, standing at nearly any location in the viewing space 102, wearing the 3D stereo glasses 110 views imagery illuminated by a first one of the light streams 131 or 135 with their left eye 106 due to filtering by the first filter/lens 112 of imagery illuminated by a second one of the light streams 135 or 131. Concurrently, the viewer views imagery illuminated by the second one of the light streams 135 or 131 with their right eye 108 due to filtering by the second filter/lens 114 of imagery illuminated by the first one of the light streams 131 or 135. As a result, the viewer 104 perceives receipt of left and right eye images so as to view or see a 3D image or object 144 extending outward from the display surface 123 (or at a location between their eyes 106, 108 and the surface 123 in the viewing space 102 or inward behind surface 123).

Figure 2:
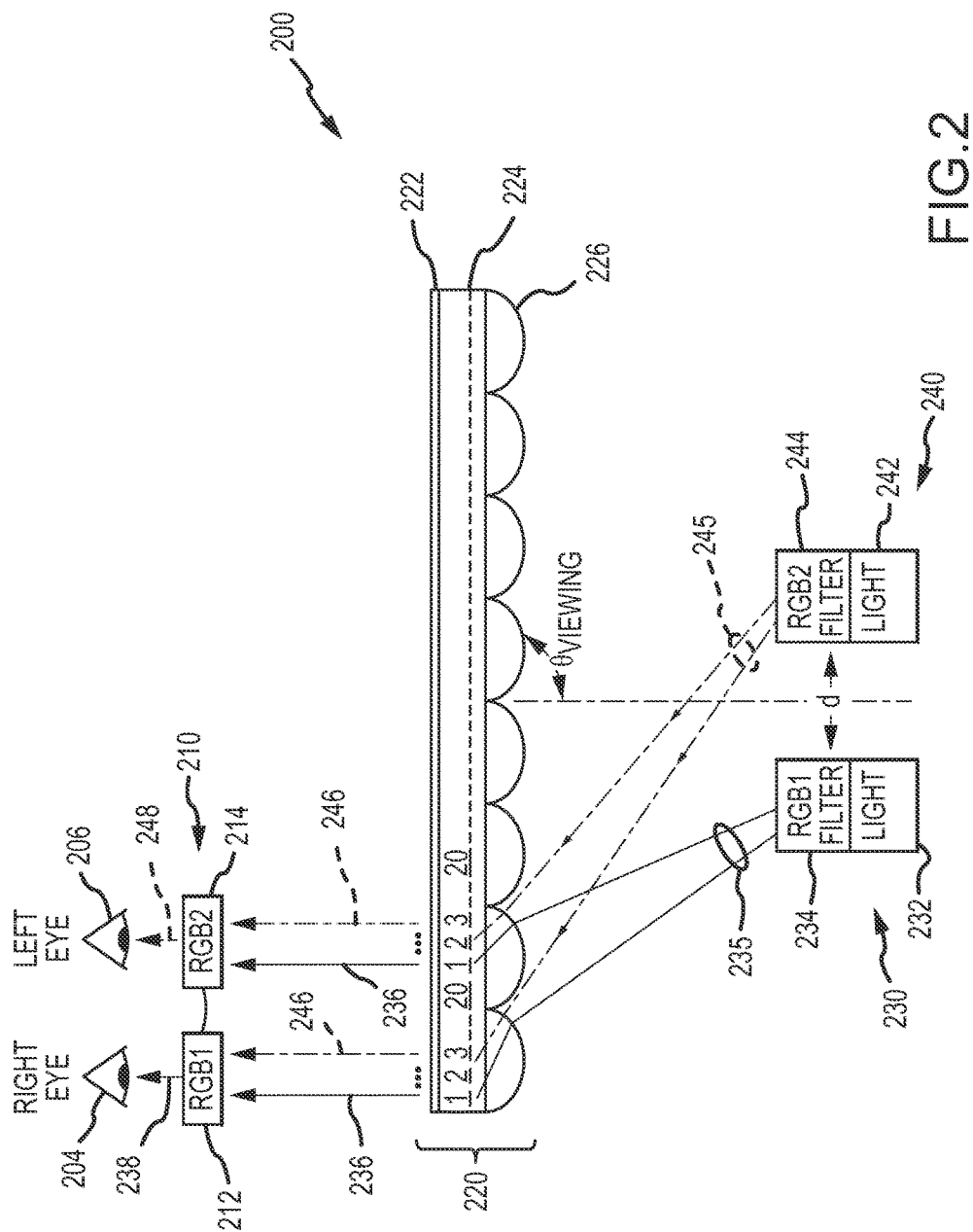
FIG. 2 is top functional block or schematic view of a portion of a 3D display system of the present description that utilizes a lenticular 3D panel for the 3D mural element.

FIG. 2 illustrates with a schematic or functional block diagram of another 3D display system 200 making use of a lenticular 3D panel/poster for a 3D mural element 220 (as viewed from above). A viewer may be located in a viewing space looking at or facing a planar display surface of the mural element 220 provided by a diffuser film or layer 222, and the viewer is wearing a pair of 3D stereo glasses 210 with a first filter 212 covering the viewer's right eye 204 and a second filter 214 covering the viewer's left eye 206. If the glasses 210 are adapted for Dolby 3D, the first filter 212 may be a RGB1 filter (allowing RGB1 light through) while the second filter 214 may be a RGB2 filter (allowing RGB2 light through). The 3D mural element 220 includes an ink or image layer 224 with a number of interlaced images (e.g., 20 images with a slice of each provided under each lenticule as shown with the repeating pattern of slice of image 1, slice of image 2 . . . slice of image 20, and repeat). A sheet of lenticular material 226 is placed over these interlaced images of ink layer 224 with the lenticules or lenticular array facing away from the viewing space and the viewer's eyes 204, 206.

The 3D display system 200 further includes first and second WMV light sources 230, 240 that are provided where a viewer's eyes would be with a conventional use of the lenticular 3D panel 220. In this reverse use of panel or mural element 220, the two light sources 230, 240 may be spaced apart a distance, d, such as in the interocular range of 2 to 3 inches. The light sources 230, 240 may be positioned at a viewing angle, θViewing, relative to the planar (or generally planar) mural element 220 as may be measured relative to a plane passing through the center of the mural element 220 and with the shown angle being 90 degrees. The viewing angle, ° Viewing, and distance, d, may be chosen to illuminate a desired two sets of the slices/strips associated with a pair of the images provided in the ink layer 224.

As shown, the 3D display system is adapted for use with Dolby 3D wavelength multiplex visualization technology. To this end, the first light source 230 includes a light 232 and an RGB1 filter 234 so that it operates to output a stream 235 of light with a wavelength falling in the narrow range of wavelengths defined for RGB1 light. This light 235 strikes the lenticular material 226 and is directed onto slices/strips of a particular image (e.g., Image 1), and this image or light associated with this image 236 is transmitted from diffuser 222 to the viewer's 3D stereo glasses 210 where it is passed through RGB1 filter 212 as shown at 238 to the viewer's right eye 204 (such that the viewer perceives Image 1 as right eye images). The second light source 240 includes a light 242 and an RGB2 filter 244 so that it operates to output a stream 245 of light with a wavelength falling in the narrow range of wavelengths defined for RGB2 light. This light 245 strikes the material 226 and is directed onto slices/strips of a particular image differing from the first image (e.g., Image 3), and this image or light associated with this image 246 is transmitted from diffuser 222 to the viewer's 3D stereo glasses 210 where it is passed through RGB2 filter 214 as shown at 248 to the viewer's left eye 206 (such that the viewer perceives Image 3 as left eye images).

Figure 2A:
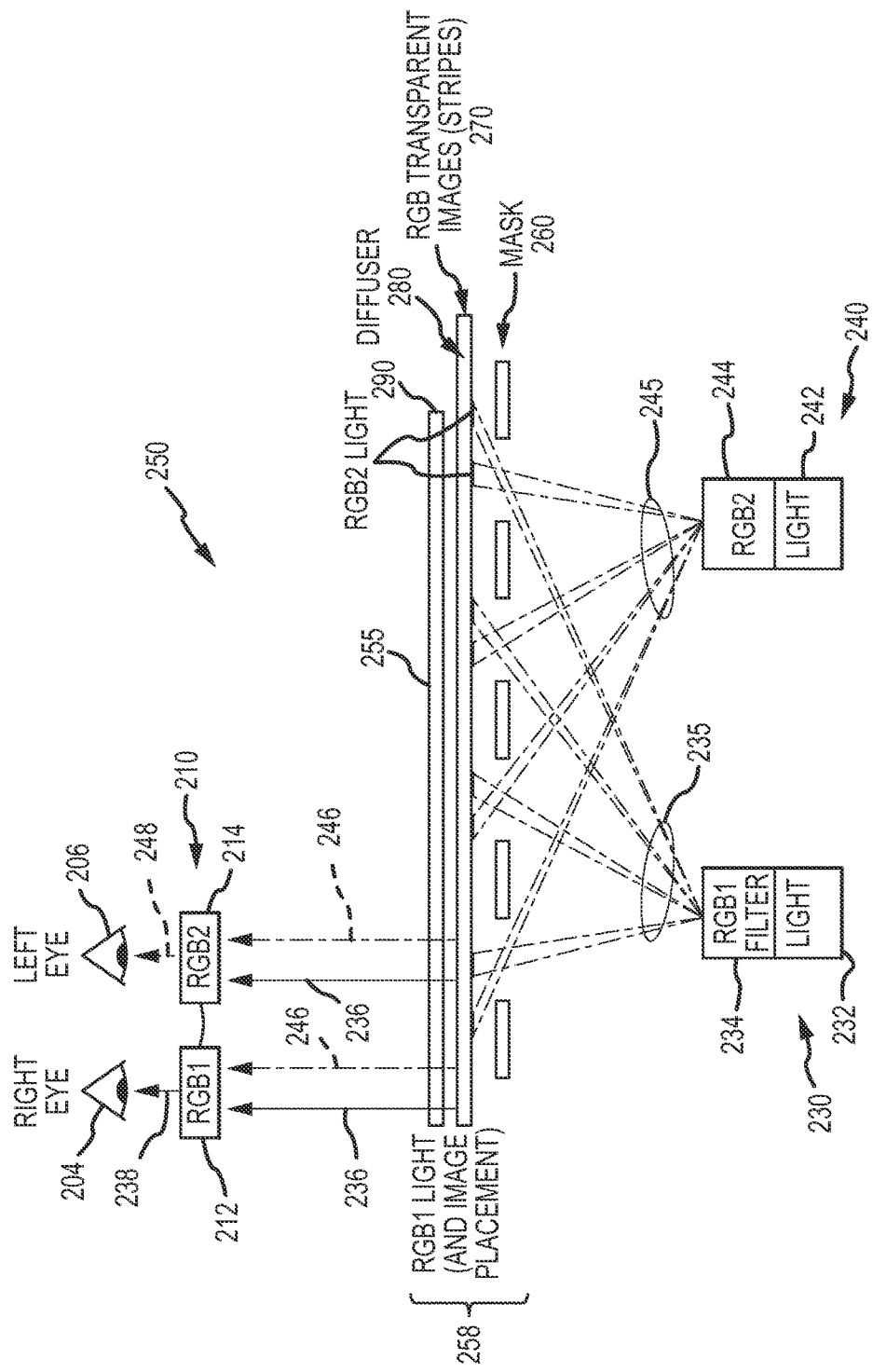
FIG. 2A is a top functional block or schematic view of a portion of another 3D display system similar to that of FIG. 2 but using a parallax barrier rather than a lenticular 3D panel to provide a 3D mural element.

The inventors and others skilled in the art will understand that with the system 200 of FIG. 2 understood that other layers or elements may be used in place of the lenticular sheet or layer of system 200 to provide surface multiplexing of multiple RGB narrowband spectra. For example, FIG. 2A shows a display system 250 that makes use of the concepts and techniques of parallax barriers. The system 250 includes a number of the components of system 200, and these features are provided with like numbers as in FIG. 2 and are not described again in detail for the sake of brevity.

As shown, FIG. 2A illustrates with a schematic or functional block diagram a 3D display system 240 making use of a parallax barrier "poster" or screen 258 for a 3D mural element (as viewed from above). A viewer may be located in a viewing space looking at or facing a planar display surface of the mural element 258 provided by a diffuser film or layer 280, and the viewer is wearing a pair of 3D stereo glasses 210 with a first filter 212 covering the viewer's right eye 204 and a second filter 214 covering the viewer's left eye 206. If the glasses 210 are adapted for Dolby 3D, the first filter 212 may be a RGB1 filter (allowing RGB1 light through) while the second filter 214 may be a RGB2 filter (allowing RGB2 light through). The 3D mural element 258 includes an ink or image layer 270 with a number of interlaced images or elongated slices of an image, which may be printed on or provided on a diffuser 280 (e.g., opposite the viewer in a viewing space). A mask (or parallax barrier) 260, which includes a plurality of spaced apart strips, is placed over these interlaced images of ink layer 270 with the strips/linear barriers facing away from the viewing space and the viewer's eyes 204, 206.

The 3D display system 200 further includes first and second WMV light sources 230, 240 that are provided where a viewer's eyes would be with a conventional use of the parallax barrier-based poster or panel 258. The two light sources 230, 240 may be spaced apart a distance, d, such as in the intraocular range of 2 to 3 inches. The light sources 230, 240 may be positioned at a viewing angle, $\theta_{Viewing}$, relative to the planar (or generally planar) mural element 258 as may be measured relative to a plane passing through the center of the mural element 258 and with the shown angle being 90 degrees. The viewing angle, $\theta_{Viewing}$, and distance, d, may be chosen to illuminate a desired two sets of the slices/strips associated with a pair of the images provided in the ink layer 270 to output or transmit RGB1 and RGB2 light as shown at 255.

As shown, the 3D display system 250 is adapted for use with Dolby 3D wavelength multiplex visualization technology. To this end, the first light source 230 includes a light 232 and an RGB1 filter 234 so that it operates to output a stream 235 of light with a wavelength falling in the narrow range of wavelengths defined for RGB1 light. This light 235 strikes the mask/parallax barrier 260 and is directed onto slices/strips of a particular image (e.g., Image 1) in ink or image layer 270, and this image or light associated with this image 236 is transmitted from diffuser 280 as shown at 255 to the viewer's 3D stereo glasses 210 where it is passed through RGB1 filter 212 as shown at 238 to the viewer's right eye 204 (such that the viewer perceives Image 1 as right eye images). The second light source 240 includes a light 242 and an RGB2 filter 244 so that it operates to output a stream 245 of light with a wavelength falling in the narrow range of wavelengths defined for RGB2 light. This light stream 245 strikes the mask 260 and is directed onto slices/strips in image layer 270 of a particular image differing from the first image (e.g., Image 3), and this image or light associated with this image 246 is transmitted from diffuser 270 as shown at 255 to the viewer's 3D stereo glasses 210 where it is passed through RGB2 filter 214 as shown at 248 to the viewer's left eye 206 (such that the viewer perceives Image 3 as left eye images).

The inventors further recognized that if the light sources are able to scan or move back and forth across the lensed side of the lenticular 3D panel or mural element then different images in the ink or image layer will be illuminated. In such a display system, an animated 3D object or image would be observed by a viewer. Instead of rotating or moving the pair of WMV light sources, multiple switched source pairs may be used.

Figure 3:
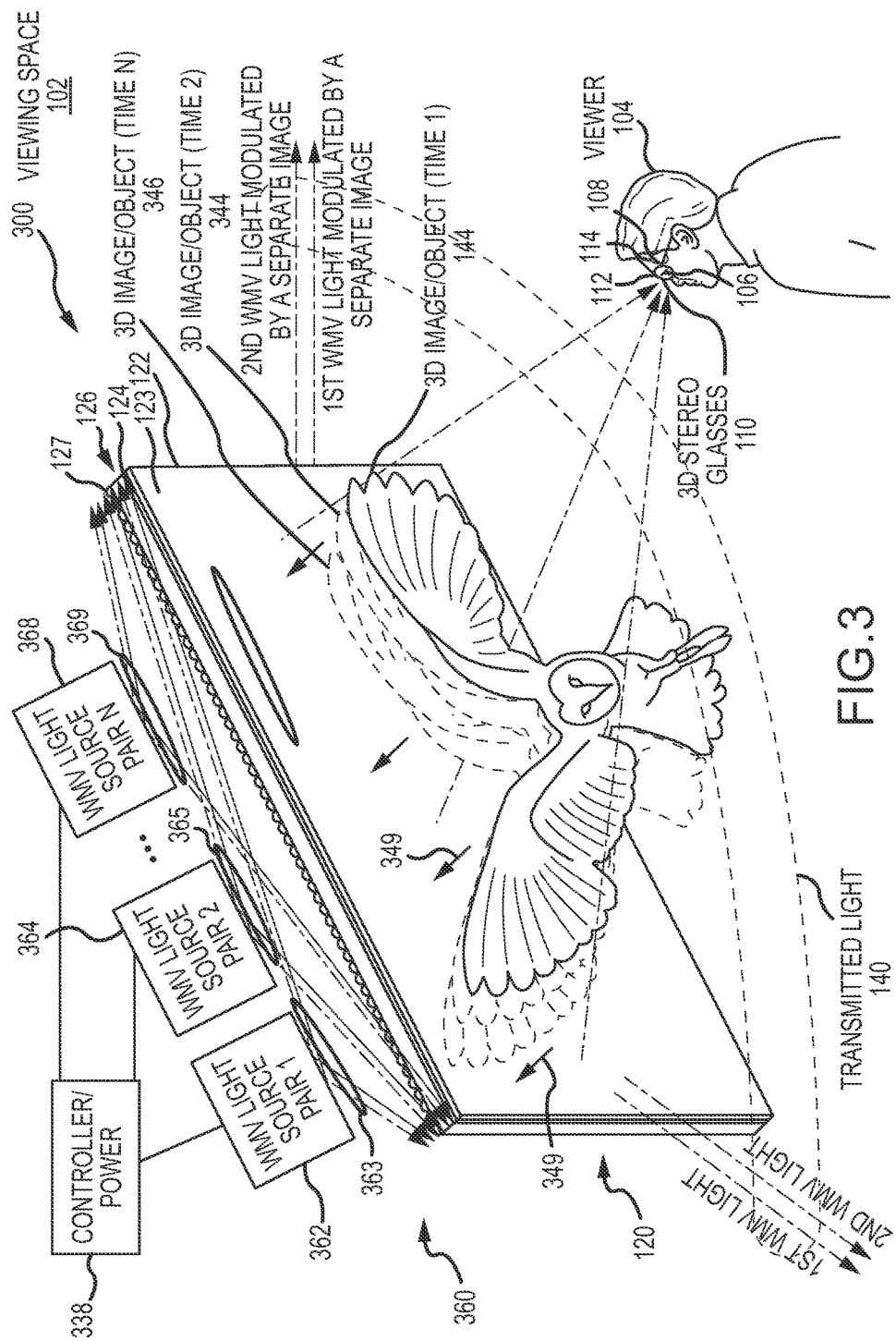
FIG. 3 illustrates a 3D display system similar to that of FIG. 1 but as modified to provide an animated 3D effect with a fixed lenticular 3D panel as the mural element.

In this regard, FIG. 3 illustrates a 3D display system 300 (which is a modified version of the system 100 of FIG. 1 with like items numbered as in FIG. 1 and not described separately in detail at this point in the description). As shown, the system 300 includes a light source assembly 360 of two or more pairs of WMV light sources. In a Dolby 3D application of system 300, for example, each pair of light sources would include a light source able to provide RGB1 light and a light source able to provide RGB2 light. As shown, the assembly 360 includes a first WMV light source pair 362 operable to concurrently output first and second WMV streams 363 (e.g., a RGB1 light stream and a RGB2 light stream). A second WMV light source pair 364 is provided that can be independently operated to provide first and second WMV streams 365, and the light source pair 364 is positioned at an offset from the first pair 362 (or at a different viewing angle relative to the lenticular material layer 126). Three, four, or more additional pairs up to an Nth pair 368 may be provided to output first and second WMV streams 369 onto the lenticules of the layer 126. The controller 338 is configured to sequentially operate each of the WMV light source pairs 362, 364, 368 such that the viewer 104 perceives a first 3D image 144 at a first time, a second 3D image 344 at a second time, and an Nth 3D image 346 at a time N in the sequence. The switching provided by the controller may be chosen to achieve a desired effect such as to provide smooth animation (many switches per second), to switch from one 3D image to another at desired times, and so on.

In some embodiments of 3D display system (such as system 100 or 300), it may be useful to provide an optimized or modified interlacing pattern for still 3D imagery. For example, the ink layer may be printed so as to only interlace two images that would provide the left and right eye images rather than interlacing 15 to 30 or more different images under each lenticule. By only providing two images, the brightness achieved in the displayed 3D image can be significantly increased. The arrangement of these two interlaced images (or the interlacing pattern) can vary to practice this embodiment and may follow a repeating left, right, left, right pattern with each of the left and right slices being repeated over and over again under each lenticule.

Figure 4:
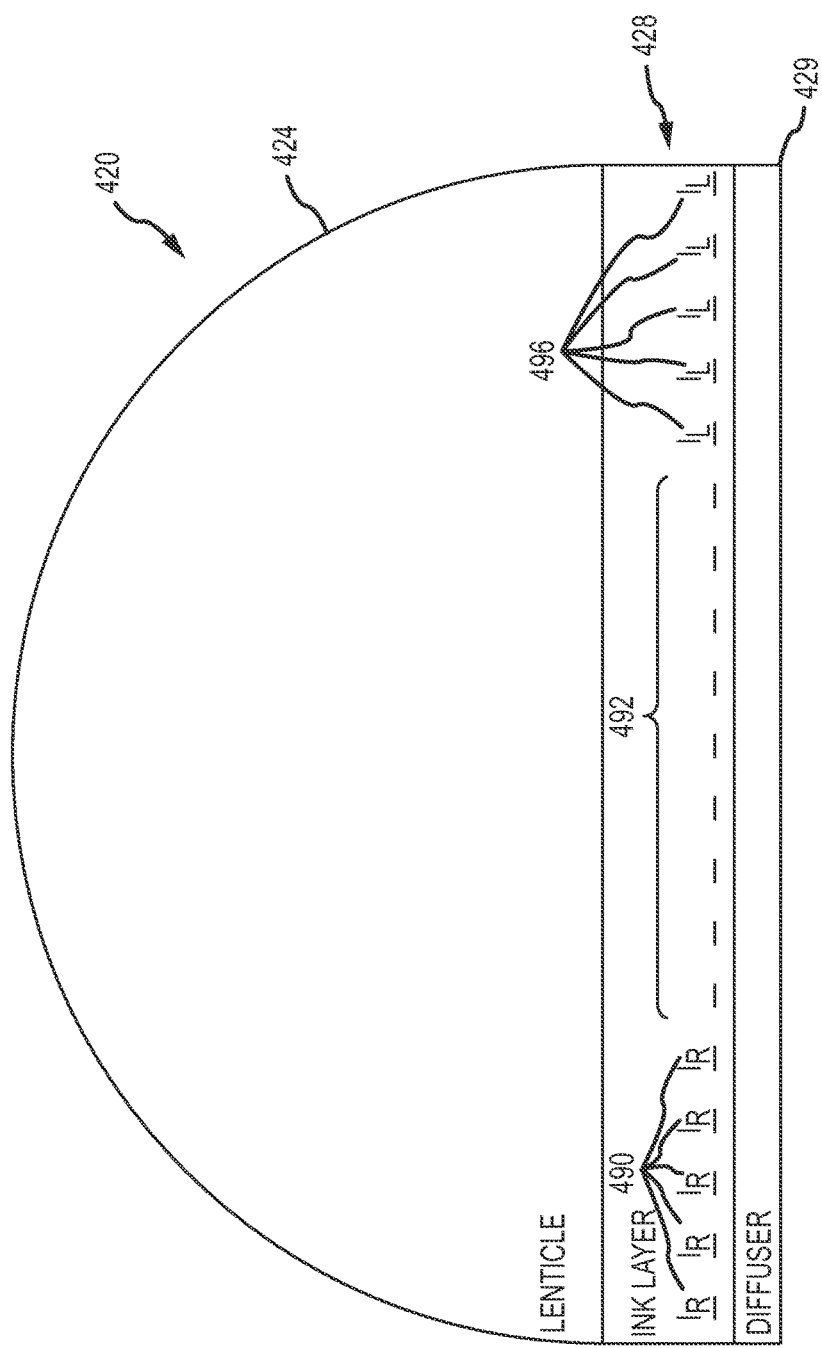
FIG. 4 illustrates a side or end view of a single lenticule portion of a 3D mural element building on lenticular technology and with a unique interlacing pattern to achieve an improved 3D image.

Alternatively, FIG. 4 illustrates a portion of a 3D mural element 420 with a new interlacing pattern of image slices to achieve an improved display image (e.g., a brighter 3D object/image with a particular light source pair). Particularly, an end view of a single lenticule portion of the mural element 420 is shown, and similar configurations would be provided for each lenticule in the 3D mural element. The mural element 420 includes lenticules with a single lenticule 424 shown, an ink layer 428, and a diffuser 429, and, in use, the diffuser 429 would be exposed to the viewer wearing 3D stereo glasses and the lenticule 424 would face a pair (or more pairs) of WMV light sources.

The mural element 420 differs from other embodiments in that the ink layer 428 is designed based on a unique interlacing pattern. Particularly, conventional interlacing processes may be adapted for use with WMV light sources such that, instead of interlacing 20 or another large number of images, slices of only two images are provided in the ink layer 428 with or without a space or black region 492 between the two sets of image slices. Further, instead of alternating between the slices of each image, an image slice may be repeated in regions of the ink layer 428 and then a blank space or region 492 (e.g., of 3 to 8 or more strip/slice widths) may be provided between these two image-repeating regions.

In the example shown, an image slice (from a first image) would be provided for the right eye and repeatedly printed at a predefined number of strip/slice locations (e.g., 2 to 10 or the like) as shown at 490. An adjacent number of the strip/slice locations would be left blank or not printed to as shown with blank region 492. Then, another image slice (from a different second image) would be provided for the left eye and repeated/printed at a predefined number of strip/slice locations (e.g., 2 to 10 or the like) as shown at 496. In the next lenticule of the lens array, a next one of the image slices from the first image would be provided in the right eye strip/slice locations, a blank region would be provided, and a next one of the image slices from the second image would be provided in the left eye strip/slice locations. This interlacing process/pattern would be followed across the entire set of lenticules to provide the ink or image layer 428. In other embodiments, wider strips/slices may be used rather than repeating the slices as shown at 490 and 496 to provide the left and right eye images under each lenticule 424.

The above embodiments utilize a 3D mural element in the form of a modified lenticular 3D panel or poster. In other embodiments, though, the 3D mural element, such as element 120 of FIGS. 1 and 3 and element 220 of FIG. 2, may be replaced with a 3D mural element having a different configuration with or without the addition of additional components in the lighting portion or assembly of the 3D display system.

For example, the 3D mural element may include a parallax-barrier element or layer in place of the lenticular material layer. One or more pairs of WMV light sources would again be used to direct first and second WMV light streams onto the parallax-barrier element or layer (e.g., with this layer facing away from the viewing space in contrast to conventional use of such a device). For example, in a 3D display system using the first type of WMV technology discussed above (e.g., a Dolby 3D-based system such as one in which the viewer is wearing 3D Dolby stereo glasses), RGB1 light from a first source and RGB2 light from a paired second source passes through the parallax-barrier element or layer so as to land on the correct vertical strips or slices of the parallel-barrier poster/panel. These illuminated strips can then be seen by the viewer (e.g., as light passes through the 3D mural element's diffuser layer). In this embodiment, instead of lenticules, thin vertical physical dividing barriers are used to insure that RGB1 light and RGB2 light strike only the left eye or right eye portions of the transparency or poster. Note, the parallax barrier may be used with both front and rear illumination.

Figure 5:
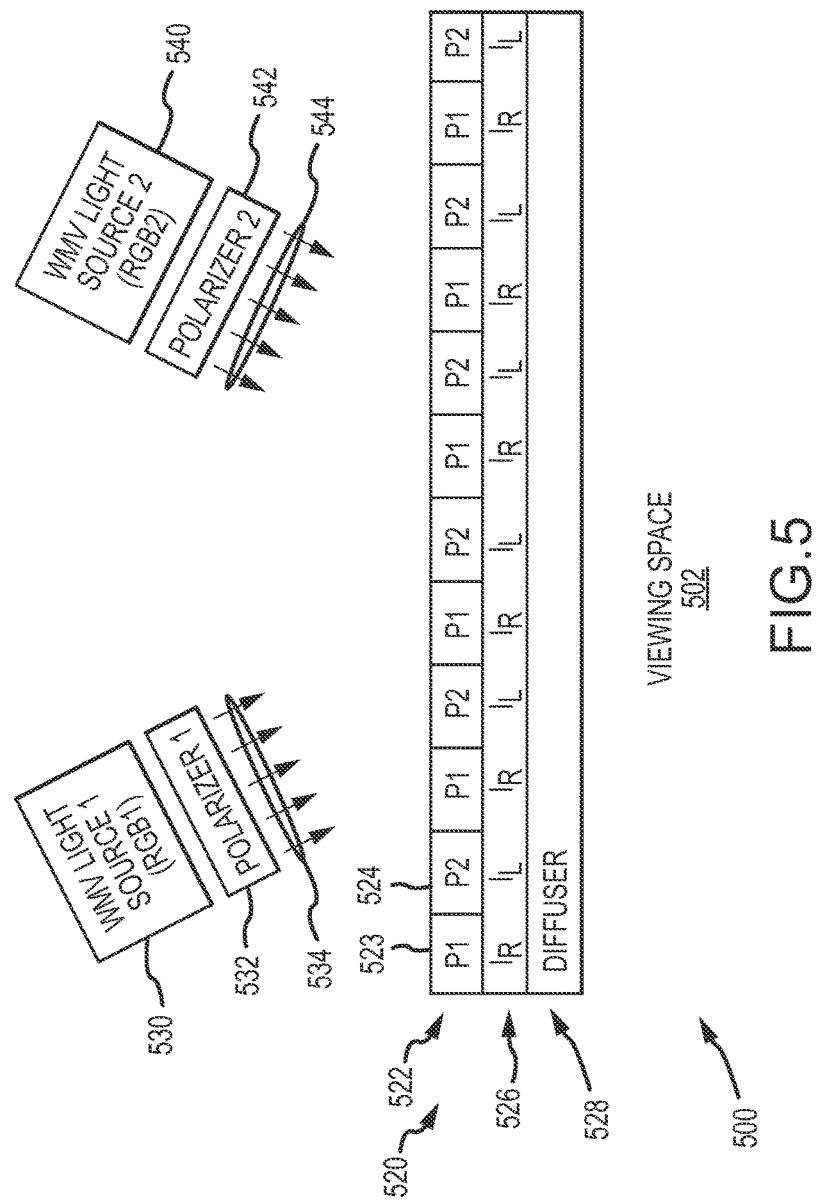
FIG. 5 is a schematic or functional block drawing of a portion of 3D display system using polarization techniques to provide a 3D effect or image in a viewing space with a 3D mural element.

In another implementation of a 3D display system 500 as shown in FIG. 5, the 3D mural element 520 may be adapted to utilize polarization techniques to provide first and second WMV light (e.g., RGB1 and RGB2 light) to a viewer wearing 3D stereo glasses (not shown but understood to be positioned in viewing space 502 as shown in FIGS. 1 and 3). For example, the lenticular material layer of the 3D mural element (e.g., element 120 of FIG. 1) may be replaced with an overlay 522 with vertical strips 523, 524 of transparent film with alternating optical polarization (alternating strips with a first polarization and a second polarization as shown with strips 523, 524). Two stereo images (e.g., Image Left and Image Right) to be displayed to the viewer can be rendered as thin vertical strips (as shown in ink or image layer 526 as $I_R$ and $I_L$) that are placed in an alternating pattern behind each of the alternating strips 523, 524 having the first and second polarizations (P1 and P2).

Then, during operation of the 3D display system 500, the surface of the overlay 522 of alternating polarization strips 523, 524 is lit with light 534, 544 from the two WMV light sources (e.g., with RGB1 and RGB2 light) 530, 540. A filter 532 matching the first polarization is provided between the first WMV light source 530 and the 3D mural element 520 while a filter 542 matching the second polarization is provided between the second WMV light source 540 and 3D mural element 520. For example, an RGB1 light source may have a vertically polarized filter over it while an RGB2 light source may have a horizontally polarized filter over it. In this example, the RGB1 light (e.g., light 534) will pass through the vertical strip polarizers and illuminate the full color, left eye image strips, and the RGB2 light (e.g., light 544) will pass through the horizontal strip polarizers and illuminate the full color, right eye image strips. If lit from the back, a diffuser (such as diffuser layer or film 528) can be placed directly against the ink layer 526 to make light coming from the polarizer strips 523, 524 of overlay 522 and ink layer 526 visible over a wide angle in the viewing space 502.

Further, the 3D display systems taught with regard to FIGS. 1-5 may be enhanced or modified to include one or more turning films (e.g., prism films). The inclusion of a turning film can be used to allow the WMV light sources to be positioned to the side of the 3D mural elements. In this way, the 3D display system can be provided in a more compact package or form factor such as 3 to 8 inches (e.g., about 6 inches) thick rather than two feet or more as may be the case for the embodiments of FIGS. 1-5 in some implementations. These thinner form factor 3D display systems may be used to provide 3D effect posters in many settings where viewers walking by the posters would be wearing 3D stereo glasses such as for coming attraction or similar posters/panels in theaters or theater complexes.

The inventors recognized that with the viewers all wearing WMV glasses (e.g., Dolby 3D glasses, Christie 6P glasses, or glasses using a different wavelength "prescription" in a WMV system) there are many other light-based effects that can be used to entertain the viewers with 3D imagery. Many of these light-based effects build on WMV technology by providing the left and right eye light directly to the viewer or by projecting the left and right eye light onto other surfaces such that light reflected or dispersed from these illuminated surfaces are perceived by the left and right eyes of the viewer wearing the WMV3D stereo glasses.

Figure 6:
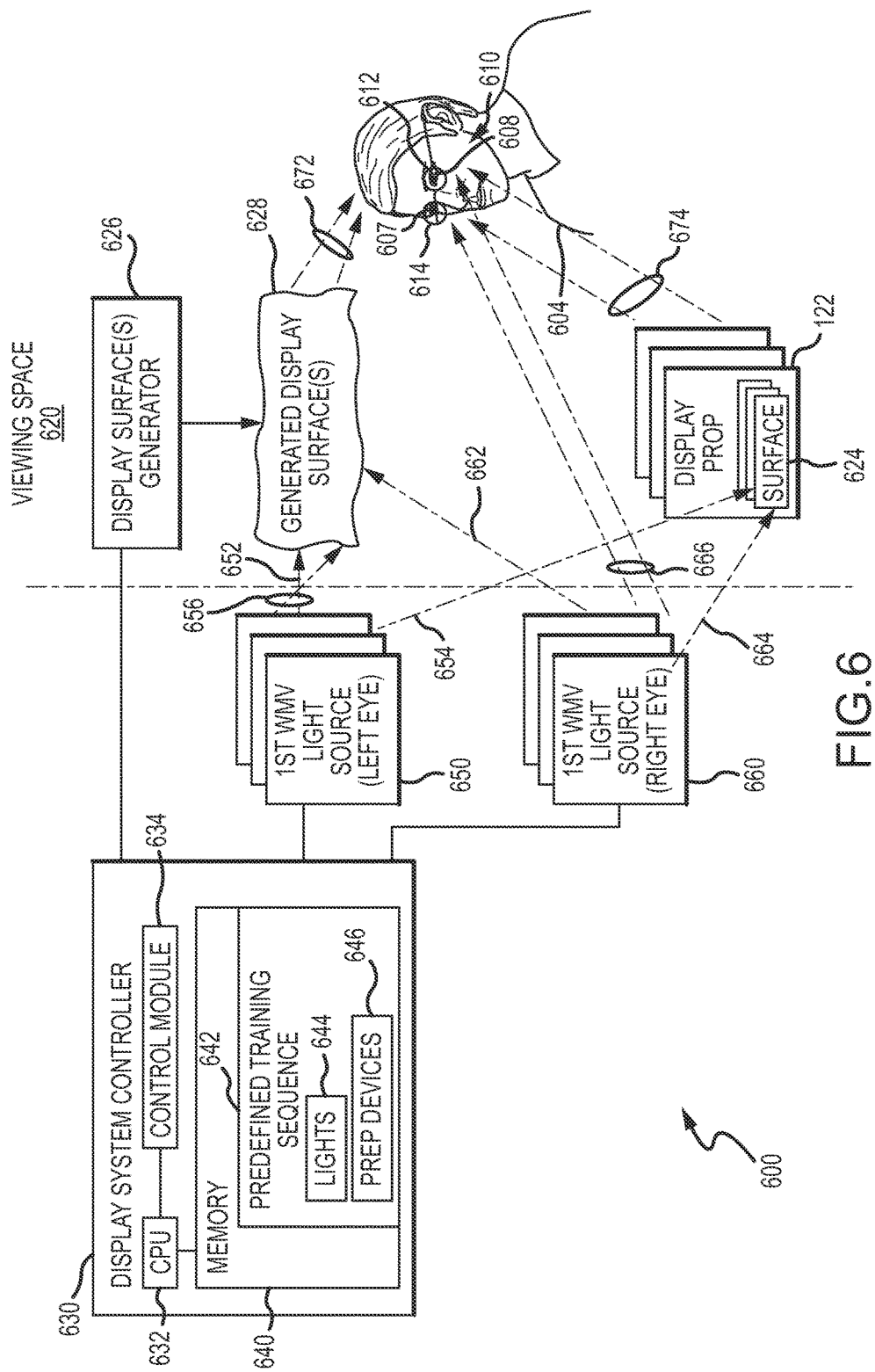
FIG. 6 is a functional block diagram of another 3D display system utilizing two (or more) light sources adapted to provide left and right eye light in a viewing space in which viewers wear wavelength multiplex visualization (WMV) glasses.

FIG. 6 is a functional block diagram of another 3D display system 600 utilizing two (or more) light sources 650, 660 adapted to provide left and right eye light in a viewing space 620 in which viewers 604 wear wavelength multiplex visualization (WMV) glasses 610. As shown, the viewer 604 wears the 3D stereo glasses 610 that have a left lens/filter 612 and a right lens/filter 614 to cover the left and right eyes 606, 607 of the viewer 604. The left lens/filter 612 is configured to filter light so as to pass a predefined band of wavelengths defined for left eye light (or a first WMV range of bandwidths) such as RGB1 light when the WMV technology is of a first type (e.g., the WMV used to provide Dolby 3D or similar WMV technology systems), and the right lens/filter 614 is configured to filter light so as to pass another predefined band of wavelengths defined for right eye light (or a second WMV range of bandwidths) such as RGB2 light when the WMV technology used by system 600 when this first type of WMV technology is utilized in the system 600.

In the viewing space 620 (e.g., along a 3D ride path or queue or a queue to or exit from a 3D cinema), the 3D display system 600 includes one or more display props 622 that each includes display surfaces 624. The 3D display system 600 further includes a display surface generator 626 that may be selectively operated to generate one or more display surfaces 628 in the viewing space 620. For example, the generator 626 may output fog, smoke, water spray or sheets, particulates, balloons, and/or other objects that provide surfaces 628 which can be selectively illuminated to achieve a desired 3D effect in the viewing space 620.

The 3D display system 600 further includes a display system controller 630 with a processor(s) 632 (e.g., may take the form of a computer or similar electronic component) that executes code/instructions (software) to provide a control module 634. The control module 634 is configured to generate and transmit control signals (and/or power) to one or more first WMV light sources (e.g., left eye bandwidth light outputs) 650 and to one or more second WMV light sources (e.g., right eye bandwidth light outputs) 660. To this end, the controller 630 includes memory 640 managed and accessible by the module 634 via the processor 632, and the memory 640 may store predefined (and user-adjustable, in some cases) timing sequences 642 for operating the light sources 650, 660 (as shown at 644) and/or the display surface generator 626 (to generate surfaces 628) and/or the props 622 (to move or modify the surfaces 624) (as shown at 646).

The first WMV light source 650 may be configured to output light in a bandwidth in the range prescribed for left eye viewing (to be passed by filter 612) while the second WMV light source 660 may be configured to output light in a bandwidth in the range prescribed for right eye viewing (to be passed by filter 614). For example, the system 600 may be adapted for use with 3D stereo glasses 610 adapted for viewing imagery projected by a WMV technology projector (e.g., a Dolby 3D projector, Christie 6P projector, or other WMV technology projector), and the sources 650, 660 are tuned or adapted to output light in the bandwidth range defined for such projectors. This may involve providing a particular filter at the output or in each source 650, 660 (e.g., an RGB1 and an RGB2 filter for a first type of WMV system such as a narrowband-based system as provided in a Dolby 3D system) or providing light sources that can be tuned or chosen to output light falling in these prescribed left and right eye light streams for a particular WMV technology such as by selecting particular high light emitting diodes (LEDs) or the like.

As shown, the 3D display system 600 may be adapted to operate the first and second WMV light sources 650, 660 to output light 652, 662 that is used to illuminate the generated display surfaces 628 such that light 672 from (e.g., reflected) these surfaces 628 is directed to the lens/filters 612, 614 of the 3D stereo glasses 610 and the left and right eyes 606, 607 of the viewer 604. The surfaces 628 may change over time due to the operation of the generator 626 and/or based on the timing sequence 646 used by the controller 630 to operate the generator 626 (e.g., to selectively output water sprays or smoke into the viewing space 620). Likewise, the light 652, 662 may be provided in a timed sequence 644 by selective operation of the sources 650, 662 by the controller 630, and this may result in both light streams 652, 662 being provided on a steady or ongoing basis, by providing both light streams 652, 662 in a desired pattern that may vary or repeat over time, and/or by alternating each stream 652, 662 over time (e.g., provide the left eye light according to one timing sequence that may differ from the timing sequence for the right eye light with or without some overlap).

Similarly, light 654, 664 may be provided by operation of the light sources 650, 660 to the display surfaces 624 of the props 622 such that light 674 from these surfaces 624 is directed to the viewer 604 and the 3D stereo glasses 610 for proper filtering to provide left and right eye imagery to the viewer's left and right eyes 606, 607. The surfaces 624 may be 3D surfaces so as to create a 3D effect. Additionally, there are some lighting effects that can be achieved by sequentially operating two or more left eye light sources 650 and two or more right eye light sources 660 to provide light 656, 666 streams to the 3D stereo glasses 610 and viewer 604. For example, a 3D spot, dot, or region of light can be caused to appear to move through the viewing space 620 relative to the viewer 604 by sequentially powering on and off a plurality of LEDs (or other light sources providing the light 656, 666) that are positioned in or viewable from the viewing space 620.

Figure 7:
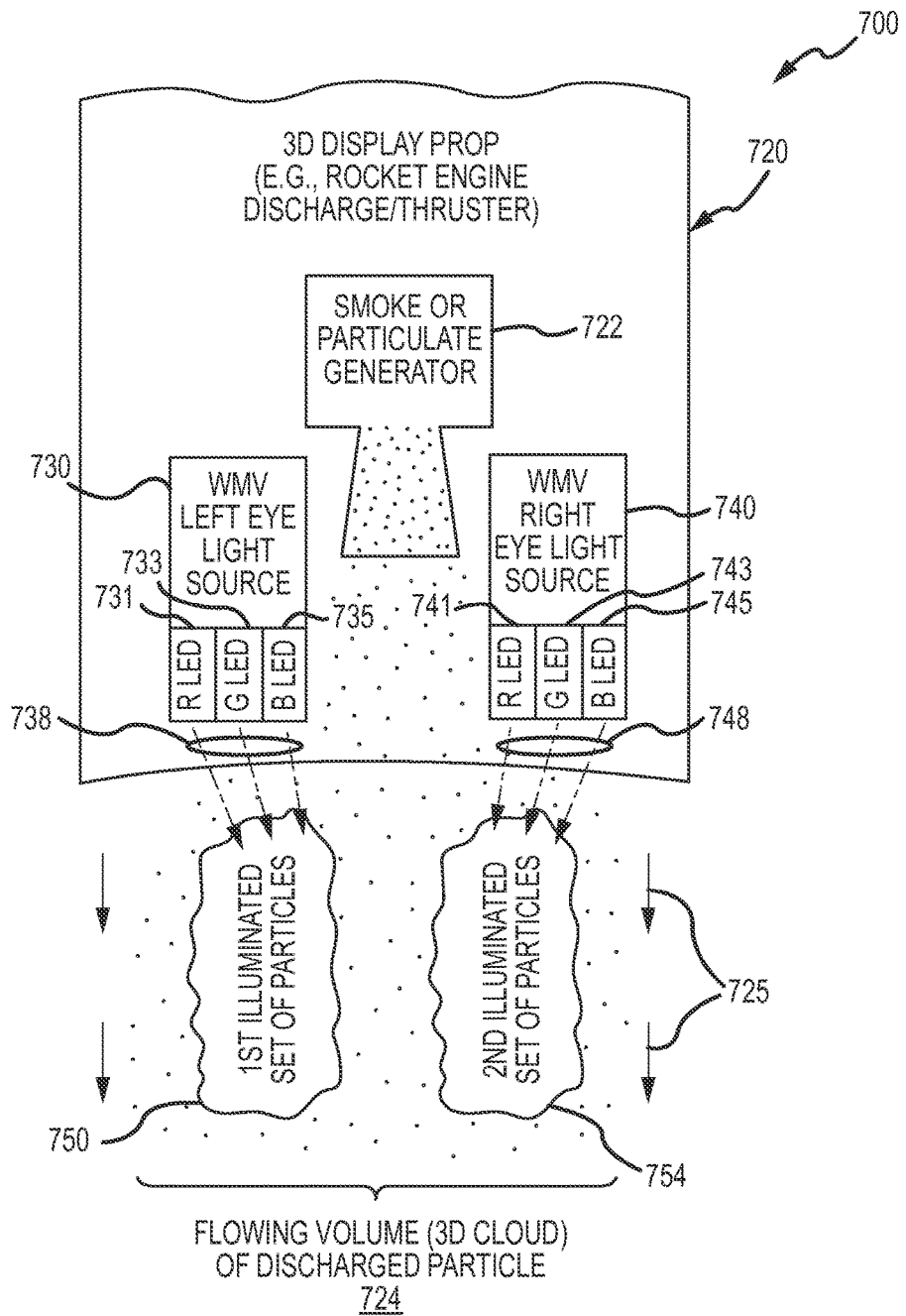
FIG. 7 is a functional block or schematic diagram of a portion of a 3D display system as may be used within the 3D systems taught herein such as shown in FIG. 6 to create a 3D effect by selectively illuminating particles discharged from a 3D display prop.

With the 3D display system 600 understood, it may be useful to describe specific examples of components that may be used to implement the system 600 for practical applications where it is desired to provide a 3D effect for viewers wearing 3D stereo glasses suited to a particular WMV technology. Particularly, FIG. 7 provides a functional block or schematic diagram of a portion of a 3D display system 710 as may be used within the 3D systems taught herein such as shown in FIG. 6 to create a 3D effect by selectively illuminating particles 724 discharged from a 3D display prop 720. For example, a 3D effect may be provided to provide the illusion that a jet or rocket engine pulsing or thrusting (e.g., has variable flames or smoke being discharged during takeoff or landing). To this end, the system 710 includes a 3D display prop 720 such as a cowling or other exterior structure of a rocket, jet, or other engine/thruster. A smoke or particulate generator 722 is positioned within the prop or housing 720 and is operated to generate and discharge a large quantity of small particulates 724 that flow out of and away from an outlet of the display prop 720 (as shown with arrows 725 that the particles provide a flowing volume or 3D cloud).

In a dark viewing space, the particles 724 may not be visible or may only be partially visible to a viewer. However, if the viewer is wearing 3D stereo glasses for a WMV technology (e.g., for a first type of WMV technology (e.g., such as that used to provide Dolby 3D or the like), for a second type of WMV technology (e.g., such as that used in Christie 6P systems or the like), or for another type of WMV technology), the particles 724 can be selectively made visible by illuminating all or portions of the particles 724 with light suited for passing through the right and/or left lens/filters of the 3D stereo glasses.

To this end, the system 710 includes a WMV-adapted left eye light source 730 and a WMV-adapted right eye light source 740 providing left and right eye light 738, 748 that is used to illuminate a first set of particles 750 and a second set of particles 754 (e.g., the particles 750 are viewable through the left eye lens of the 3D studio glasses and the particles 754 are viewable through the left eye lens of the 3D studio glasses). The first and second set of particles 750, 754 may be made up of differing particles or may partially or wholly overlap in their member particles 724. Further, the light sources 730, 740 may be operated concurrently or according to a desired time sequence so as to cause the sets 750, 754 to strobe or pulse in the moving cloud 724 to provide a 3D effect that simulates a live and pulsing thruster or rocket engine such as with moving flames or flames that change shape/size over time.

The light sources 730, 740 may take a wide variety of forms with the important design consideration being that each puts out light 738, 748 that matches the range of wavelengths (wavelength prescription) for the left and right lens of the WMV-based 3D stereo glasses. For example, the light 738 may be RGB1 light and the light 748 may be RGB2 light when the 3D stereo glasses worn by the viewers of the illuminated particle sets 750, 754 are glasses suited for the first type of WMV discussed herein (e.g., are Dolby 3D or similar WMV glasses). To this end, the light sources 730, 740 may include LEDs or other light sources that are selected or tuned to output light in these two ranges of wavelengths, with some embodiments of the system 710 including filters to achieve this result (e.g., include RGB1 and RGB2 filters (not shown)). As shown, the sources 730, 740 include red, green, blue LEDs that may be tuned to provide the light 738, 748 in a particular color (such as white for a smoke/steam 3D effect) and be chosen or tuned to provide appropriate wavelength light for the WMV technology (e.g., WMV1 and WMV2 light such as RGB1 and RGB2 light, respectively).

Figure 8:
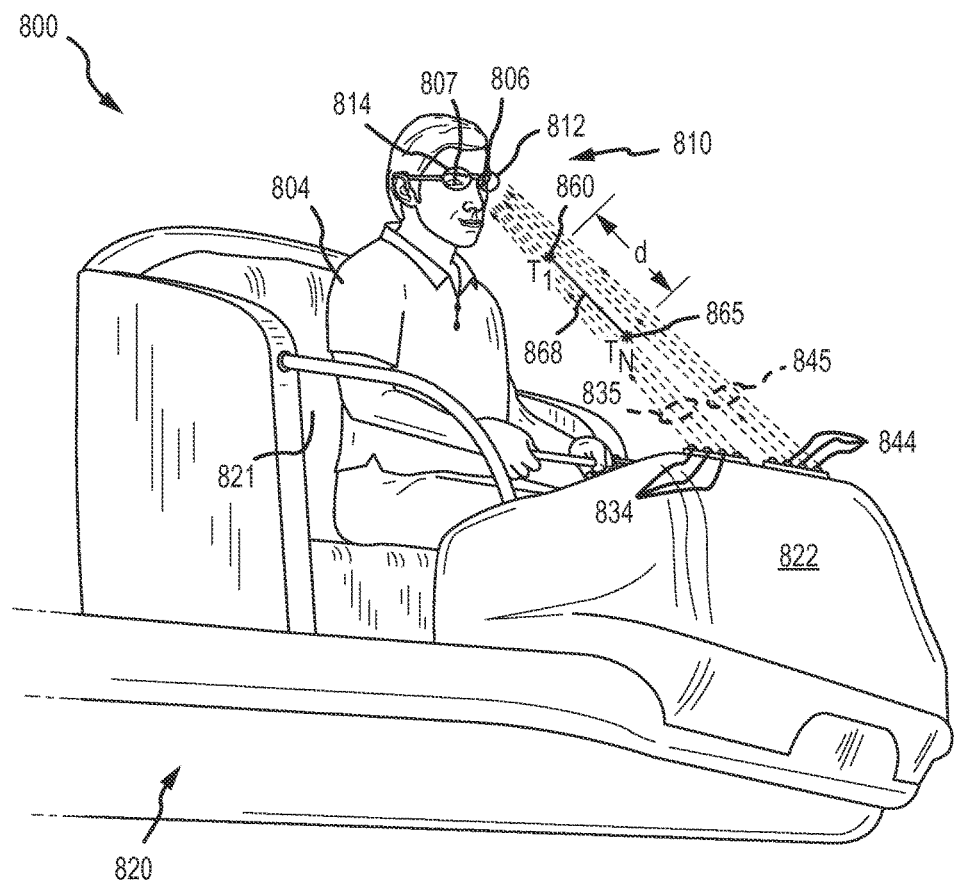
FIG. 8 is a perspective view of a ride vehicle including an implementation of a 3D display system of the present description to provide a 3D effect to a viewer in the vehicle wearing 3D stereo glasses.

FIG. 8 illustrates a 3D display system 800 that includes a ride vehicle 820, with only a single vehicle being shown but it being understood that a typical 3D ride for an amusement or theme park would include a much larger number of such vehicles in a chain or train. A viewer or rider 804 is seated in a seat 821 in the vehicle 820 to face a forward portion 822 of the vehicle (e.g., the portion that the seat back faces in the vehicle 820). The viewer/rider 804 is wearing a pair of 3D stereo glasses suited to a particular WMV technology (such as the first or second type of WMV described herein (e.g., Dolby 3D or Christie 6P or the like) with a left eye lens/filter 812 suited for passing light in a first range of wavelengths (e.g., RGB1 light when the WMV technology is the first type of WMV technology) and a right eye lens/filter 814 suited for passing light in a second range of wavelengths (e.g., RGB2 light). When the glasses 810 are worn, the left eye lens/filter 812 covers the viewer's left eye 806 and the right eye lens/filter 814 covers the viewer's right eye 807.

To create a 3D effect, the 3D display system 800 includes a first row/set of LEDs (or other light sources) 834 and a second row/set of LEDs (or other light sources) 844. The first row includes LEDs 834 that are adapted for emitting light 835 with a wavelength in the range of wavelengths passed through the first filter/lens 812 (left eye lens/filter) while the second row includes LEDs 844 that are adapted for emitting light 845 with a wavelength falling in the range of wavelengths passed through the second filter/lens 814 (right eye lens/filter) such that the light 835 is perceivable by the viewer's left eye 806 while the light 845 is perceivable by the viewer's right eye 807. The LEDs 834 and LEDs 844 may be chosen or tuned to provide light in the proper wavelength range (e.g., RGB1 light or RGB2 light) or a filter may be provided over the first and second rows to achieve the desired wavelengths in light 835, 845.

A 3D effect is achieved as shown by sequentially illuminating the LEDs 834 of the first row while the LEDS 844 of the second row are concurrently illuminated in a sequential manner (e.g., light LED1 of the first row while lighting LED1 of the second row then at a later time turn off LED1 and LED2 and light LED2 of the first row while lighting LED2 of the second row and so on). This time sequencing and concurrent illuminating of LEDs 834, 844 in the two rows causes light 835, 845 from differing LEDs 834, 844 in the rows to be perceived by the eyes 806, 807 via the filters/lenses 812, 814 of the 3D stereo glasses 810.

The result is that the viewer 804 perceives a first dot, spot, or region 860 of light at a first location at a first time, T1, and the light moves along a line over the time sequence to be a dot, spot, or region "N" as shown at 865 (with N matching the number of LEDs/light sources 834, 844 in each row) some distance, d, away from the first spot location at a second time, TN. The dots 860, 865 are animated or appear to the viewer 804 to move as shown with arrow 868 due to the sequential turning on and off the LEDs 834, 844, and the pattern that is followed or traced by dots 860, 865 is defined by the arrangement of the LEDs 834, 844 with linear rows shown in FIG. 8 such that the dots 860, 865 trace as shown with arrow 868 a line path but the line/path could be other shapes defined by the arrangement of LEDs 834, 844 (such as an arcuate path, a circle, or the like). The location of the path 868 and dots 860, 865 relative to the viewer 804 will depend upon the location of the rows 830, 840 relative to each other (how space between left and right eye LEDs/light sources concurrently lit) and to the viewer's eyes 806, 807.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, the passive ink layers of the 3D mural elements taught herein may be replaced by full motion elements such as transparent liquid crystal display (LCD) monitors or the like. Further, it should be understood that the concepts described herein are useful with nearly any existing or yet to be developed WMV technology, and the following claims are intended to cover narrowband-based WMV ("the first type of WMV"), to cover laser projector-based WMV ("the second type of WMV"), and other forms of WMV that may use a variety of light sources and paired/matched stereo glasses (or 3D stereo glasses, 3D glasses, or other label for such WMV glasses). For example, the display systems described herein may use wide spectrum sources with filters to provide the first and second WMV light sources (as shown with sources 130, 134 in FIG. 1 and so on) for mural-based displays and other light-based 3D effects. In other cases, narrowband specific LED sources may be used in the display systems of the present description. In still other display systems, the WMV light sources may take the form of or include laser-illuminated sources such as a left eye, right eye illuminator with collimating optics (e.g., a laser-based projector available from Necsel IP, Inc. or other similar projector designers/distributors) to create the lighting for the light box package.

We claim:

1. A display system for creating three dimensional (3D) imagery for a viewer in a viewing space wearing 3D stereo glasses with a first lens passing colored light in a first range of wavelengths and with a second lens passing colored light in a second range of wavelengths differing from the first range of wavelengths, comprising:
    a 3D mural element with a display surface facing and proximate to the viewing space and a light receiving surface opposite the display surface and distal to the viewing space;
    a first wavelength multiplex visualization (WMV) light source outputting a first light stream onto the light receiving surface, wherein the first light stream has a wavelength in the first range of wavelengths; and
    a second WMV light source outputting a second light stream onto the light receiving surface concurrently with the first light stream,
    wherein the second light stream has a wavelength in the second range of wavelengths,
    wherein the 3D mural element comprises a lenticular material layer and an ink layer comprising a plurality of interlaced images,
    wherein the light receiving surface comprises a plurality of lenticules of the lenticular material layer, the plurality of lenticules facing away from the viewing space and toward the first and second WMV light sources, and
    wherein the first and second light streams pass through the 3D mural element to the viewing space via the plurality of lenticules and the ink layer.

2. The display system of claim 1, wherein the interlaced images comprise a set of slices of a first eye image and a set of slices of a second eye image and wherein, under each of the lenticules, a first one of the slices of the first eye image are repeated at a first plurality of adjacent interlacing locations and a corresponding first one of the slices of the second eye image are repeated at a second plurality of adjacent interlacing locations spaced apart from the first plurality of the adjacent interlacing locations.

3. The display system of claim 1, wherein the first and second WMV light sources are positioned relative to the light receiving surface at first and second viewpoints spaced apart a distance within the interocular range.

4. The display system of claim 1, further comprising additional pairs of the first and second WMV light sources, wherein each of the pairs of the first and second WMV light sources are sequentially operated over a time period, whereby the 3D imagery is animated over the time period.

5. The display system of claim 1, wherein the first WMV light source includes one or more lights and a first WMV filter providing the first light stream with the wavelength in the first wavelength range and wherein the second WMV light source includes one or more lights and a second WMV filter providing the second light stream with the wavelength in the second wavelength range.

6. The display system of claim 1, wherein the first wavelength range and the second wavelength range correspond with first and second wavelength ranges, respectively, of light output from a WMV projector.

7. The display system of claim 6, wherein the WMV projector comprises at least one projector implementing a narrowband-based WMV or a laser projector-based WMV.

8. A display system for creating three dimensional (3D) imagery for a viewer in a viewing space wearing 3D stereo glasses with a first lens passing colored light in a first range of wavelengths and with a second lens passing colored light in a second range of wavelengths differing from the first range of wavelengths, comprising:
- a 3D mural element with a display surface facing the viewing space and a light receiving surface opposite the display surface;
- a first wavelength multiplex visualization (WMV) light source outputting a first light stream onto the light receiving surface, wherein the first light stream has a wavelength in the first range of wavelengths; and
- a second WMV light source outputting a second light stream onto the light receiving surface,
- wherein the second light stream has a wavelength in the second range of wavelengths, and
- wherein the light receiving surface of the 3D mural element comprises a parallax barrier and wherein the 3D mural element includes an ink layer adapted for use with the parallax barrier.

9. The display system of claim 8, wherein the first and second WMV light sources are positioned relative to the light receiving surface with outputs spaced apart a distance in the range of interocular distances.

10. The display system of claim 8, further comprising additional pairs of the first and second WMV light sources, wherein each of the pairs of the first and second WMV light sources are sequentially operated over a time period, whereby the 3D imagery is animated over the time period.

11. The display system of claim 8, wherein the first WMV light source includes one or more lights and a first WMV filter providing the first light stream with the wavelength in the first wavelength range and wherein the second WMV light source includes one or more lights and a second WMV filter providing the second light stream with the wavelength in the second wavelength range.

12. The display system of claim 8, wherein the first wavelength range and the second wavelength range correspond with first and second wavelength ranges, respectively, of light output from a WMV projector.

13. The display system of claim 12, wherein the WMV projector comprises at least one projector implementing a narrowband-based WMV or a laser projector-based WMV.

14. A display system for creating three dimensional (3D) imagery for a viewer in a viewing space wearing 3D stereo glasses with a first lens passing colored light in a first range of wavelengths and with a second lens passing colored light in a second range of wavelengths differing from the first range of wavelengths, comprising:
- a 3D mural element with a display surface facing the viewing space and a light receiving surface opposite the display surface;
- a first wavelength multiplex visualization (WMV) light source outputting a first light stream onto the light receiving surface, wherein the first light stream has a wavelength in the first range of wavelengths; and
- a second WMV light source outputting a second light stream onto the light receiving surface,
- wherein the second light stream has a wavelength in the second range of wavelengths,
- wherein the 3D mural element comprises a layer of interlaced thin strips of transparent material with first and second polarization and further comprises an ink layer comprising alternating first and second eye images, the layer of interlaced thin strips providing the light receiving surface that faces the first and second WMV light sources, and
- wherein the first WMV light source comprises a first filter whereby the first light stream has the first polarization and the second WMV light source comprises a second filter, whereby the second light stream has the second polarization.

15. The display system of claim 14, further comprising additional pairs of the first and second WMV light sources, wherein each of the pairs of the first and second WMV light sources are sequentially operated over a time period, whereby the 3D imagery is animated over the time period.

16. The display system of claim 14, wherein the first WMV light source includes one or more lights and a first WMV filter providing the first light stream with the wavelength in the first wavelength range and wherein the second WMV light source includes one or more lights and a second WMV filter providing the second light stream with the wavelength in the second wavelength range.

17. The display system of claim 14, wherein the first wavelength range and the second wavelength range correspond with first and second wavelength ranges, respectively, of light output from a WMV projector.

18. The display system of claim 17, wherein the WMV projector comprises at least one projector implementing a narrowband-based WMV or a laser projector-based WMV.

* * * * *